(12) United States Patent
Hunter et al.

(10) Patent No.: US 11,307,762 B2
(45) Date of Patent: Apr. 19, 2022

(54) OPERATING USER INTERFACES

(71) Applicant: Hewlett-Packard Development Company, L.P., Spring, TX (US)

(72) Inventors: Andrew Hunter, Bristol (GB); Madhu Sudan Athreya, Palo Alto, CA (US); Will Allen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/770,717

(22) PCT Filed: Jan. 31, 2018

(86) PCT No.: PCT/US2018/016193
§ 371 (c)(1),
(2) Date: Jun. 8, 2020

(87) PCT Pub. No.: WO2019/152013
PCT Pub. Date: Aug. 8, 2019

(65) Prior Publication Data
US 2020/0356249 A1 Nov. 12, 2020

(51) Int. Cl.
*G06F 3/0488* (2013.01)
*G06F 3/04883* (2022.01)
(Continued)

(52) U.S. Cl.
CPC .......... *G06F 3/04883* (2013.01); *G06F 21/32* (2013.01); *G06K 9/00335* (2013.01)

(58) Field of Classification Search
CPC .. G06F 3/04883; G06F 21/32; G06K 9/00335
See application file for complete search history.

(56) References Cited

U.S. PATENT DOCUMENTS 5,682,326 A * 10/1997 Klingler ............... G11B 27/034
715/202
8,413,075 B2 4/2013 Ording et al.
(Continued)

FOREIGN PATENT DOCUMENTS

| JP | 2009051253 | 3/2009 |
|---|---|---|
| WO | WO-2015050545 | 4/2015 |
| WO | WO-2015121175 | 8/2015 |

*Primary Examiner* — Seth A Silverman
(74) *Attorney, Agent, or Firm* — Haseltine Lake Kempner LLP

(57) ABSTRACT

A method, an apparatus and a machine-readable medium are disclosed. The method relates to operating a user interface. The method may include obtaining, using a sensor associated with a first processing apparatus, data indicative of a pose of an control element and a gesture performed by the control element; delivering the data indicative of the pose and the gesture from the first processing apparatus to a second processing apparatus, the second processing apparatus associated with a computing device for displaying a user interface, wherein the second processing apparatus is remote from the first processing apparatus; generating, based on the data indicative of the pose, a representation of the control element to be presented on the user interface; presenting the representation of the control element on the user interface; determining, using the second processing apparatus, an operation corresponding to the performed gesture; and performing the operation in respect of the user interface on the computing device.

14 Claims, 5 Drawing Sheets

(51) Int. Cl.
    *G06F 21/32*     (2013.01)
    *G06K 9/00*     (2022.01)

(56) References Cited

U.S. PATENT DOCUMENTS

| | | | |
|---|---|---|---|
| 2008/0273755 A1* | 11/2008 | Hildreth | G06K 9/00375 |
| | | | 382/103 |
| 2009/0002342 A1 | 1/2009 | Terada et al. | |
| 2012/0194561 A1 | 8/2012 | Grossinger et al. | |
| 2015/0205358 A1* | 7/2015 | Lyren | G06F 3/04883 |
| | | | 715/765 |
| 2015/0355715 A1* | 12/2015 | Smith | G06F 1/1694 |
| | | | 715/863 |

* cited by examiner

OPERATING USER INTERFACES

BACKGROUND

A user interface, such as a graphical user interface (GUI), may be controlled using an input device, such as a mouse, a keyboard or a touchpad. In some examples, a user may operate a touchscreen to control or interact with a user interface.

A touchscreen display, or touchscreen, may provide a user with an intuitive mechanism by which to interact with a computing device.

BRIEF DESCRIPTION OF DRAWINGS

Examples will now be described, by way of non-limiting example, with reference to the accompanying drawings, in which.

DETAILED DESCRIPTION

Examples of the present disclosure relates to a new way of operating a user interface, such as a graphical user interface of a computing device. The methods and apparatus disclosed herein may be used as an alternative to, or in addition to existing mechanisms, including keyboards, mice, touchpads, touchscreens and the like. In contrast to existing mechanisms, however, examples of the present disclosure enable a user or operator to interact with a user interface without being in the vicinity of the user interface or the computing device running the user interface.

Figure 1:
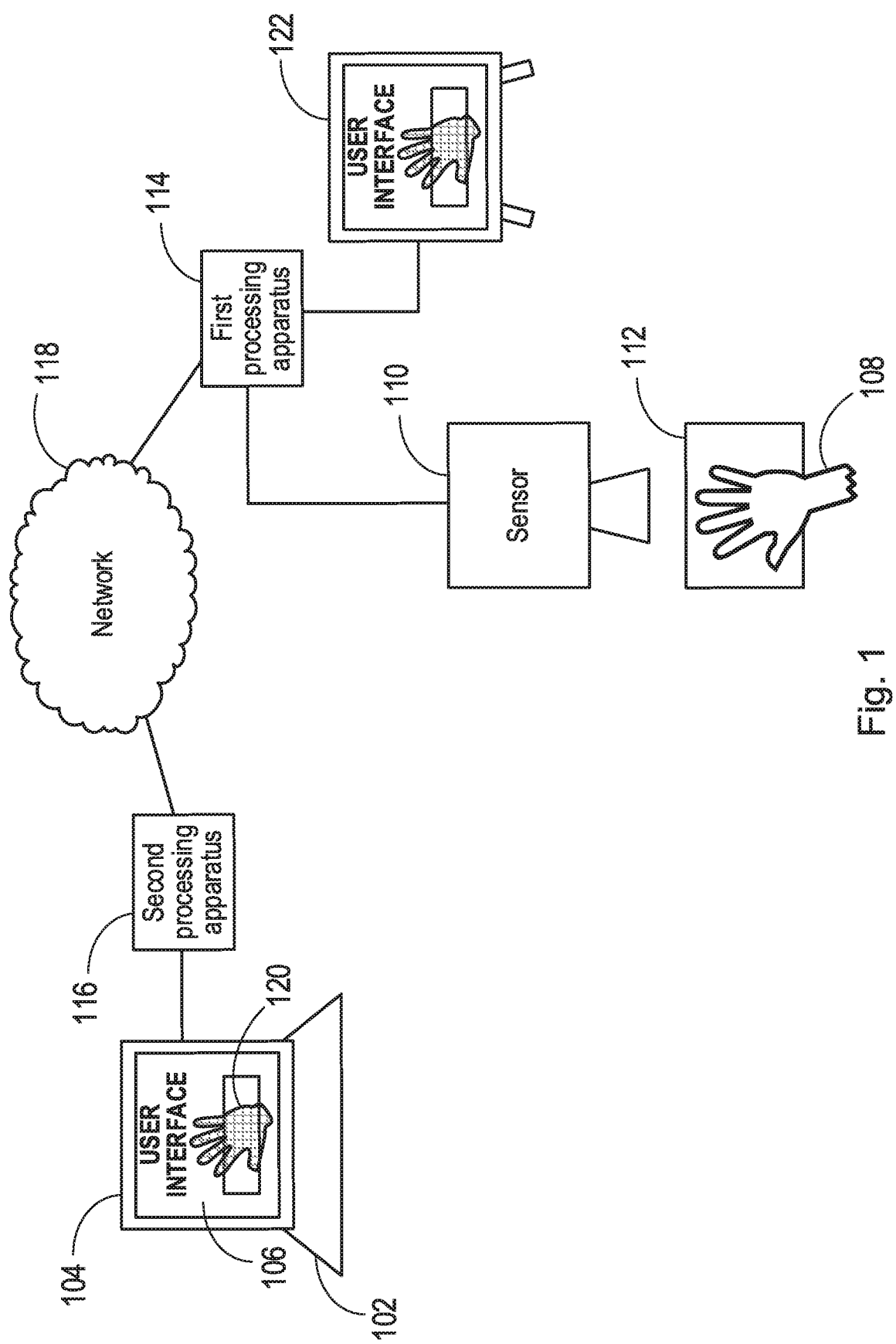
FIG. 1 is a simplified schematic of an example of an arrangement for operating a user interface.

An example of an arrangement 100 for operating the user interface in accordance with the methods and apparatus disclosed herein is shown schematically in FIG. 1. From the following description, it will be appreciated that the methods and apparatus disclosed herein may be implemented using arrangements having fewer or more components than those shown in FIG. 1. In the arrangement 100 of FIG. 1, a first computing device 102 is associated with a first display 104. For example, the first computing device 102 may comprise a desktop computer, a laptop computer, a tablet computer, smartphone or the like. The first display 104 may comprise a display screen of the first computing device 102 or a separate display device associated with (e.g. connected to and/or configured to display content provided by) the first computing device.

The first display 104 may be configured to display a user interface 106, which may form part of an operating system. The user interface 106 may, for example, comprise a user interface of a computer program package. The computing device 102 and/or the display 104 may include a user input device (not shown) for operating the computing device and/or for interacting with the user interface 106. For example, the computing device 102 may include a touchpad, or may be connected to a mouse. The display 104 may comprise a touchscreen display, which enables a user to interact with a user interface displaying on the display by touching various portions of the display, for example using their finger. In this example, however, the user interface 106 displayed on the display 104 is to be controlled or interacted with by an operator who is remote from the user interface 106, the display 104 and the computing device 102. In some embodiments, the operator may interact with the user interface 106 using a control element 108, such as their hand. Examples are described herein in the context of an operator using their hand to control or interact with the user interface 106. However, it will be understood that the operator may use some other control element, such as another part of their body (e.g. their head or their foot), or a tool, such as a wand or pointer, to operate the user interface. When a control element other than the operator's hand is used to operate the user interface, a corresponding representation (i.e. a representation of the control element used) may be generated using the techniques described below.

In order to achieve interaction with the user interface 106, the operator may use a sensor 110, which is configured to capture data describing aspects of the control element 108, and the captured data may then be used to control the user interface. In some examples, the sensor 110 may include an image-capturing device, such as a camera. For example, the camera may comprise a depth camera, capable of capturing imaging data of the control element 108 and depth information describing, for example, the distance of various parts of the control element from the camera. In other examples, the sensor 110 may comprise a time-of-flight sensor, a plurality of cameras arranged to capture a stereo, and/or three-dimensional image, radar sensor, an ultrasound sensor, or the like. In some examples, the sensor 110 may include a combination of different sensors, such as those mentioned above. The sensor 110 may, for example, comprise an image capture device associated with a computing device, such as a webcam of a laptop computer.

In the example shown in FIG. 1, the sensor 110 is located above the control element 108 which, in this example is the operator's hand. However, in other examples, the sensor 110 may be located differently with respect to the control element 108. For example, the sensor or sensors 110 may be located below, next to, or surrounding the control element 108.

The sensor 110 may capture data indicative of a pose of the control element 108. As used herein, the term "pose" is intended to refer to a posture or arrangement, which may include data indicative of an outline of the control element 108, and an orientation and/or a position of the control element relative to the sensor 110 and/or a reference surface. The data indicative of a pose of the control element 108 may include both orientation and position data relative to a reference point as a particular pose or gesture performed with the control element in one location relative to the may have a different effect to the same pose or gesture performed in another location. The sensor 110 may also capture data indicative of a gesture performed by the control element 108. To this end, the sensor 110 may capture a series of images and/or a video stream of any movement of the control element 108. To ensure that sufficient detail is captured regarding the pose and/or any movement of the control element 108, the sensor 110 may be configured to capture images at a particular frame capture rate. For example, the sensor 110 may be configured to capture images at a rate of at least 30 frames per second (fps). In other examples, a higher or lower capture rate may be used, as intended by the operator.

As used herein, the term "gesture" is intended to refer to a particular motion, movement or pattern performed by a control element, such as an operator's hand, which causes a particular functionality for effect in respect of the user interface 106. For example, one gesture that an operator may perform using their hand may involve the operator clenching his or her hand into a fist, then opening the first to hold the hand flat. This gesture may correspond to a particular function, such as "grabbing" an item presented on the user interface 106. Another gesture may involve varying the distance between two fingers (or a finger and thumb) of the operator's hand. This gesture may correspond to a particular function, such as enlarging, or zooming in (if the distance between the fingers is increased) or decreasing a size, or zooming out (if the distance between the fingers is decreased). In some examples, and element of the user interface (e.g. icon representing a document or file, or an image or a document itself) may be "flicked" to another area on the user interface, to a different user interface (e.g. a user interface presented on a different display) or to a another operator (e.g. towards a representation of a further operator's hand or other control element). Such a function may be interpreted if the sensor 110 detects a "flicking" or "throwing" movement or gesture made by the operator's hand. In some examples, the flicking motion may be considered to be a dynamic aspect of a pose of the control element rather than a gesture. The first and/or second processing apparatus 114, 116 may include a physics engine capable of applying physics-based simulations (e.g. simulating speed and direction of movement of an element) based on the motion made by the control element 108. In some examples, a further gesture, such as a "catch" gesture may be performed by a further operator, enabling them to receive the element which has been flicked, or thrown, towards them. Using this functionality, the first operator may throw or pass a user interface item from one display to another.

In some examples, interactions with the user interface 106 by the control element 108 may be made possible using a touch input surface 112. The touch input surface 112 may, in some examples, form part of the sensor 110. In other examples, the touch input surface 112 may be a separate device from the sensor 110, and may be associated with (e.g. connected to) the sensor 110. The touch input may comprise a mat or pad with which an operator may make contact using his or her hand 108. For example, an operator may touch the touch input surface 112 with a finger, or multiple fingers, of their hand 108. The touch input surface 112 may comprise a touch screen, touchpad, or other touch-sensitive device configured to receive touch inputs which can be used to operate the user interface 106. In some examples, the touch input surface 112 may sense pressure in addition to a binary touch. Thus, the touch input surface 112 may, in some examples, measure a degree or level of touch, such as whether the operator has applied a soft touch or a hard touch.

In some examples, and operator may initiate, activate for start operation of the sensor 110 by touching the touch input surface 112. For example, the operator may use their hand 108 to perform a particular gesture, such as a double tap with one finger, in order to cause the sensor 110 to begin capturing data indicative of the pose of the control element.

The sensor 110 is associated with a first processor, or processing apparatus 114. In examples where a touch input surface 112 is provided, the touch input surface may also be associated with the first processing apparatus 114. The first processing apparatus 114 may comprise a processor or processors of a computing device, or may comprise a processor of a server. Thus, the first processing apparatus 114 may form part of a cloud computing environment. The first processing apparatus 114 may be configured to receive an input and/or data captured by the sensor 110 and/or data from the touch input surface 112. In some examples, the first processing apparatus 114 may serve as a controller to control the sensor 110 and/or the touch input surface 112.

Data indicative of a pose of the control element 108 and data indicative of a gesture performed by the control element may be encoded at the first processing apparatus 114. The data, or the encoded data, may then be delivered from the first processing apparatus 114 a second processing apparatus 116. In this example, the second processing apparatus 116 is a located remotely from the first processing apparatus 114, such that data from the first processing apparatus may be transmitted wirelessly to the second processing apparatus. In some examples, the data may be transmitted via a network, such as the Internet 118. In other examples, alternative wireless transmission protocols may be used. In other examples, processing described above as being performed by the first and second processing apparatus 114, 116, may be performed by a single processing apparatus.

The second processing apparatus 116 is, in the current example, associated with the first computing device 102. In some examples, the second processing apparatus 116 may be associated with the display 104. For example, the display 104 may be controlled by and/or receive instructions from the second processing apparatus 116. In this way, the second processing apparatus 116 may cause the user interface 106 to be displayed or presented on the first display 104, such that the display may be operated without the first computing device 102. In some examples, the second processing apparatus 116 may form part of the first computing device 102. For example, the second processing apparatus 116 may comprise a processor within the first computing device 102.

Data indicative of the pose of the control element 108, which is captured by the sensor 110 may, therefore, be transmitted by the first processing apparatus 114, via a network (e.g. the Internet 118) to the second processing apparatus 116. The data indicative of the pose of the control element 108 is used to generate a representation 120 of the control element to be presented on the user interface 106. For example, an outline of the control element 108 may be captured using sensor 110 and the outline may be recreated over the user interface 106, and displayed on the display 104. According to some examples, data is captured continuously, or at a relatively high capture rate, by the sensor 110, and the representation 120 presented on the user interface 106 is refreshed continuously, or at a relatively high refresh rate, such that changes in the pose of the control element 108 are presented on the user interface. If the rate of data capture and the refresh rate of the representation 120 are high enough, then the movement of the control element 108 will appear, almost in real time, in the representation on the user interface 106.

Rendering the representation 120 of the control element 108 on or over the user interface 106 may include generating or creating a new display element associated with the user interface, for example by defining an appropriate path and fill style for the representation. The path may have points corresponding to points defining an outline of the control element, and the fill style may be defined so that the path defining the outline is filled in black or grey with an intended degree of transparency.

The appearance of the representation 120 of the control element 108 on the user interface 106 may take various forms. However, in many examples, the representation 120 may appear at least partially transparent, such that the user interface 106 is visible to a viewer. In some examples, the representation 120 may appear as a shaded representation, for example to represent a shadow of the control element 108. Thus, the representation 120 may not comprise an accurate representation of the control element 108 having details such as fingernails and knuckles, but may include a detailed representation of the outline of the control element with simple shading. By providing a simple representation 120 without representing the detail present on the operator's actual hand 108, focus of a viewer may be drawn to the underlying user interface 106 rather than to the representation 120. Furthermore, by representing the control element 108 on the user interface 106 with a see-through or transparent representation 120, a viewer is able to see which parts of the user interface are being interacted with by the control element, and the manner in which the control element is interacting with the user interface. Furthermore, viewers of the user interface 106 and, in some cases, the operator will be able to see the pose and position of the control element (i.e. the representation 120), along with the exact portions or elements of the user interface that are participating in the interaction.

As noted above, data indicative of a gesture performed by the control element 108 is delivered from the first processing apparatus 114 to the second processing apparatus 116. A gesture may include any movement made by the control element 108 which can be interpreted as an operation or instruction to be performed in relation to the user interface 106. In some examples, where the control element is the operator's hand, the gesture may include a particular motion by a finger (or multiple fingers) of the operator's hand 108 which is to be interpreted as a selection of an item or an element of the user interface 106. In this way, such a gesture may be considered equivalent to a button of a mouse, or catching an element of a user interface using a touchscreen display, for example. A gesture may also be considered as part of a hybrid interaction, or combination of interactions. For example, an operator may virtually touch an element on the user interface by moving the representation 102 over the element, then cause the interaction by applying some other input, such as speaking a phrase (e.g. "activate") or depressing a foot pedal. Such combinations may enable an operator to make selections on the user interface in an intuitive manner. In other examples, a selection may be made in a number of other ways, as discussed below. In some examples, a control element 108 (e.g. the operator's hand) may be held substantially in a plane (e.g. a reference plane such as a horizontal plane). The sensor 110 may determine when part of the operator's hand 108 (e.g. a finger) is moved out of the plane, for example if an operator were to remove their index finger temporarily downwards, as if pressing a button of a mouse. Such movement of a finger may be interpreted (e.g. by the first processing apparatus 114) as a touch event in respect of the user interface 106. For example, a touch event on the user interface 106 may be registered at the particular location at which the representation of the operator's finger (i.e. the finger that performed the selection gesture) is present. In some examples, moving a control element out of a particular reference plane may have a particular effect, such as causing a rotation within the user interface. In other examples, such as examples in which a touch input surface 112 is used, a selection gesture may be registered when the operator touches or presses part of their hand 108 (e.g. a finger or fingers) or the control element on the touch input surface. Again, the touch event on the user interface 106 may be registered at the particular location at which the representation of the operator's finger or control element is present.

In some examples, the operator may move their hand 108 relative to a reference plane in order to effect particular operations with respect to the user interface. For example, a reference plane may form a "virtual surface" with which the operator may interact or touch. A particular pose or posture of the control element 108 on one side of the plane or virtual surface may have a first effect while the same pose or posture may have a second effect if the control element is touching or has moved beyond the virtual surface. In some examples, an amount by which the control element 108 moves beyond the virtual surface may also have an effect on an operation performed in respect of the user interface 106. Furthermore, the pressure, or speed at which the control element touches or passes beyond the virtual surface may also affect the operation. For example, a gentle touch extending a short distance beyond the virtual surface may represent a request for a standard shutdown of the user interface, while a rapid push extending far beyond the virtual surface may represent a panic stop and shut down operation. In further examples, the depth beyond the virtual surface to which the control element 108 extends may indicate a particular operation. For example, the distance beyond the virtual surface that an operator moves their hand may represent the amount by which a button in the user interface 106 is pressed. The depth, or distance beyond the virtual interface, may be represented in the user interface itself, for example by adjusting a portion of the representation 120. In some examples, a colour of a tip of a finger of the representation 120 may be varied in relation to the distance that the finger extends beyond the virtual surface. In other examples, a user interface element such as a circle may be displayed, and the size of the circle may represent the distance extended beyond the virtual surface.

In some examples, a touch input surface 112 may not be included. In such examples, a selection of an element in the user interface 106 may be registered in response to a particular gesture performed by the control element 108, and/or by a particular pose of the control element. In some examples, an operator may move a portion of the representation 120 of their hand over a selectable element of the user interface 106 for at least a minimum amount of time (e.g. three seconds) to select that element. In some examples, a selection may be made when the user extends only the index finger of their hand, and the tip of their index finger is held over the selectable element for a determined duration.

In some examples, a display 122 may be provided for displaying a representation of the user interface 106 and a further representation 120 of the control element 108 to the operator. The display 122 may, in some examples, comprise a display screen, a television, or a further computing device, such as a desktop computer, tablet computer, smart phone or a wearable device. In some examples, the display may comprise a projector and screen arrangement, such as a projection device configured to project onto a wall. The display 122 may allow an operator to view the user interface 106 and the interactions that they are having with user interface as a result of the gestures performed by their hand 108.

Using an arrangement and method as discussed above and shown in FIG. 1, and operator who is located remote from a user interface 106 may operate and/or interact with the user interface using their hand 108. The data indicative of the pose (e.g. the outline) of their hand can be used to generate the representation 120 on the user interface 106, so that a viewer of the user interface is able to see how the operator is interacting with it. Furthermore, the data indicative of any gestures performed by the control element can be used to perform interactions and operations with the user interface, enabling an operator to manipulate portions of the user interface, perform data entry into the user interface, and otherwise perform actions in respect of user interface which might otherwise be possible using other control devices.

Figure 2:
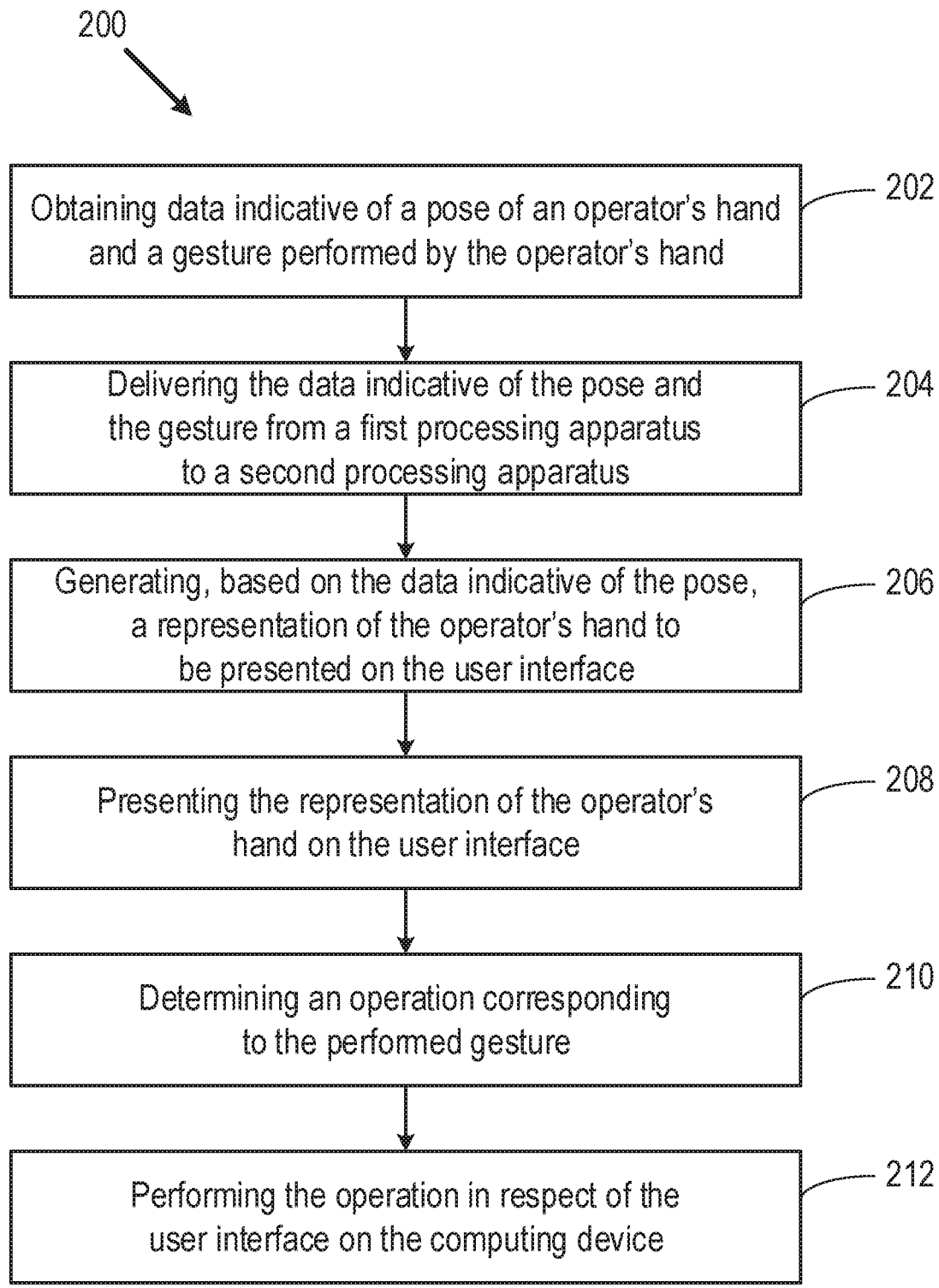
FIG. 2 is a flowchart of an example of a method for operating a user interface.

The examples discussed above with reference to FIG. 1 are described in more general terms with reference to FIG. 2. FIG. 2 is a flowchart of an example of a method 200 for operating a user interface, such as the user interface 106. The method 200 comprises, at block 202, obtaining, using a sensor 110 associated with a first processing apparatus 114, data indicative of a pose of a control element 108 and a gesture performed by the control element. At block 204, the method 200 comprises delivering the data indicative of the pose and the gesture from the first processing apparatus 114 to a second processing apparatus 116, the second processing apparatus associated with a computing device 102 for displaying a user interface 106, wherein the second processing apparatus is remote from the first processing apparatus. At block 206, the method 200 comprises generating, based on the data indicative of the pose, a representation 120 of the control element to be presented on the user interface 106. The method 200 comprises, at block 208, presenting the representation 120 of the control element on the user interface 106. At block 210, the method 200 comprises determining, using the second processing apparatus 116, an operation corresponding to the performed gesture. At block 212, the method 200 comprises performing the operation in respect of the user interface 106 on the computing device 102.

In some examples, the control element 108 may comprise a hand of the operator.

Using the method discussed above with reference to FIG. 2, an operator is able to interact with the user interface 106 from a remote location, using a sensor 110 which may communicate, via a processor, with a computing device 102 running the user interface. By presenting a representation 120 of the operator's hand 108 or control element on the user interface 106, a viewer of the user interface is able to see how the operator is interacting with user interface even though the viewer may not be within sight of the operator. By using the method 200, an operator may also interact with a user interface 106 which is presented or displayed on a particularly large display screen. Since any interactions with the user interface 106 are made by the operator performing gestures with their hand 108, the control element can remain in the field of view of sensor 110 while still being able to virtually move (i.e. the representation 120 may move) over the user interface, however large the display.

In the examples described above, it is possible that the operator can interact with and/or operate a user interface 106 even though the computing device 102 running the user interface and/or the user interface itself may be out of sight of the operator. Such an arrangement may be suitable in situations where the operator is able to interact with the user interface 106 without seeing it. For example, in an emergency situation, an operator may be able to cause the user interface 106 to switch off, or sound an alarm, simply by tapping the user interface a defined number of times (e.g. five times). The operator may perform such a gesture using their hand 108 such that the sensor 110 captures the pose of the control element and the gesture (e.g. tapping a finger five times), and the first processing apparatus 114 may send that data to the second processing apparatus 116 where the gesture is interpreted and the corresponding operation is performed in respect of the user interface. In other examples, however, the ability of the operator to view the user interface 106 may aid their ability to interact with the user interface. Thus, in some examples, the user interface 106 may be displayed to the operator (e.g. using the display 122) so that the operator can perform any interactions in a more reliable manner, and so that the operator can see any effects resulting from their actions.

Since the pose or posture of the control element 108 is shown to viewers of the user interface (i.e. as the representation 120), viewers (and the operator if they are able to view the user interface or a representation thereof) are able to view the actual interaction between the operator and the user interface, and also to interpret an intention of the operator. For example, a viewer may see the operator move the representation of their hand to a particular element (e.g. an icon) on the user interface 106, with their hand held in a particular pose. The viewer may understand from the pose and the position of the representation 120 on the user interface 106 that the operator intends to perform a particular operation (e.g. selecting a particular icon). This can help the viewer and the operator to better understand how the user interface 106 is being used.

Figure 3:
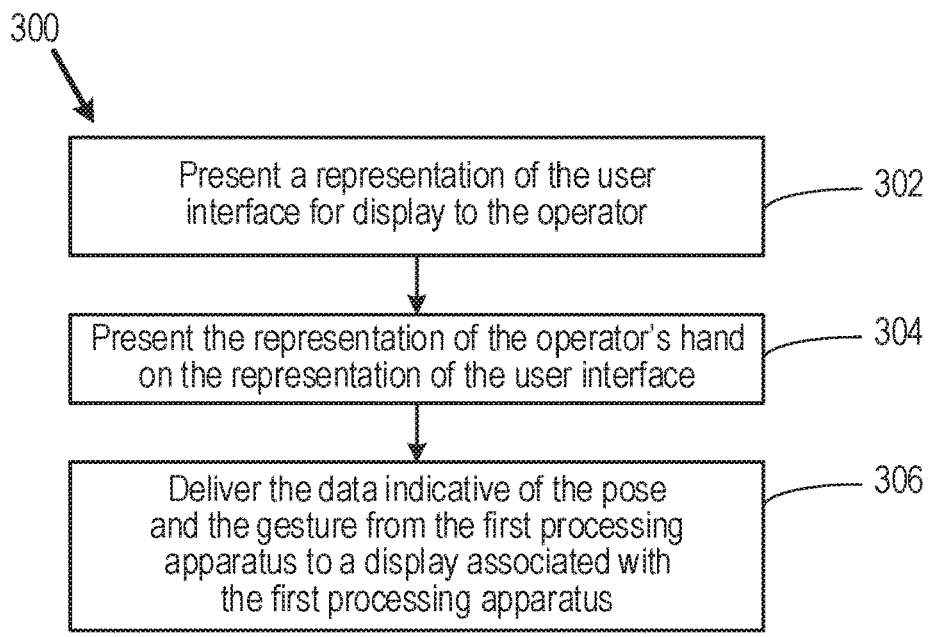
FIG. 3 is a flowchart of a further example of a method for operating a user interface.

FIG. 3 is a flowchart of a further example of a method 300 for operating a user interface, such as the user interface 106. The method 300 may comprise one or more blocks of the method 200 discussed above. The method 300 may comprise, at block 302, presenting a representation of the user interface 106 for display to the operator. At block 304, the method 300 may comprise presenting the representation 120 of the control element on the representation of the user interface. The representation of the user interface 106 and the representation 120 of the control element (e.g. the operator's hand) may, in some examples, be presented on a display screen associated with the operator (e.g. the display 122) and/or within view of the operator. In some examples, representations of the user interface and the control element may be displayed in some other way, such as on a mobile device (e.g. a tablet computer or a smartphone) or on a surface (e.g. a wall) using a projection system. In this way, the operator can see the user interface 106 running on the computing device 102, and can see the position of their hand (i.e. from the position of representation 120 of the control element) relative to the user interface. Further, the operator can experience the effect of any interactions they make with the user interface 106.

The method 300 may comprise, at block 306, delivering the data indicative of the pose and the gesture from the first processing apparatus 114 to a display 122 associated with the first processing apparatus. Presenting the representation of the user interface 106 may comprise presenting the representation of the user interface on the display 122. As noted above, the display 122 may comprise a display device such as a television or a computing device, or the display may comprise a screen onto which a projection system may present the representations of the user interface and the control element.

In order to generate the representation 120 of the control element 108, the second processing apparatus 116 may use location data for a plurality of points around a perimeter of the control element (e.g. data indicating the location of the plurality of points relative to the sensor 110). While a basic representation 120 of the control element 108 may be generated using a small number of data points, it will be appreciated that a more accurate representation can be generated using a larger number of data points. Thus, the data indicative of the pose may include at least an outline of the control element, such as the operator's hand 108. In addition to the outline of the control element, the sensor 110 may capture data indicative of other points on the control element. For example, the sensor 110 may capture data indicative of an approximate centre of a fingerprint for each finger, or data indicative of an approximate location of a fingertip for each finger. When the operator's hand is used as the control element 108, the additional data captured by the sensor 110 may be used to determine whether a finger of the operator's hand 108 is performing a touch event on the user interface. For example, a touch event may be registered when a fingertip of the operator's hand is moved in a particular way.

As noted above, the representation 120 of the control element 108 may, in some examples, comprise a transparent, or partially transparent representation. Thus, generating the representation of the control element (block 206) may comprise generating a representation through which the user interface 106 remains visible. In this way, the viewer of the user interface 106 may still be able to see those portions of the user interface which would otherwise be hidden by the control element 108, had the operator been interacting with the user interface using their actual hand.

Figure 4:
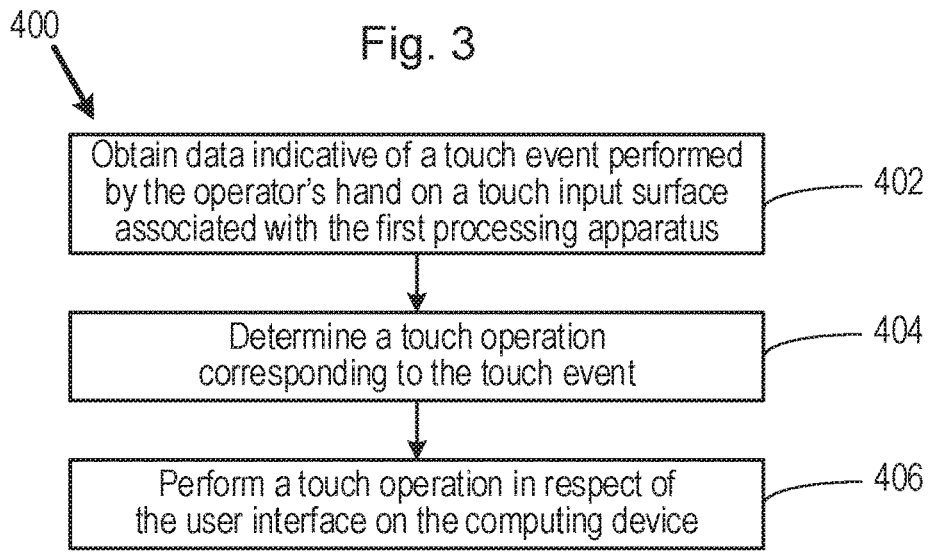
FIG. 4 is a flowchart of a further example of a method for operating a user interface.

As discussed above, touch events may be registered when the control element 108 is moved in a particular way (e.g. as part of a gesture) or when a portion of the control element touches a touch sensitive surface, such as the touch input surface 112. FIG. 4 is a flowchart of a further example of a method 400 for operating a user interface. The method 400 includes operations relating to touch events. Processes and blocks described above with reference to the methods 200, 300 may form part of the method 400. The method 400 may comprise, at block 402, obtaining data indicative of a touch event performed by the control element (e.g. the operator's hand 108) on a touch input surface 112 associated with the first processing apparatus 114. While, in some examples, the touch input surface 112 may comprise a touch-sensitive device, such as a touchpad, configured for receiving touch events, the touch input surface may, in other examples, comprise a sensor configured to detect when the control element touches the particular surface, such as a table-top. For example, an optical sensor arrangement may be used, such as a light beam or a series of light beams directed across the particular surface, which register a touch event when broken or interrupted. At block 404, the method 400 may comprise determining, using the second processing apparatus 116, a touch operation corresponding to the touch event. The method 400 may comprise, at block 406, performing a touch operation in respect of the user interface 106 on the computing device 102. Thus, in addition to recognising a gesture performed by the control element 108 (e.g. the operator's hand), the second processing apparatus 116 may recognise a touch event, such as a finger of the operator's hand 108 moving in a particular way so as to mimic or imitate pressing a button of a mouse, and/or recognising a touch on a particular surface. A touch operation performed in respect of the user interface 106 may, for example, comprise a selection operation, analogous to clicking a mouse button.

Figure 5:
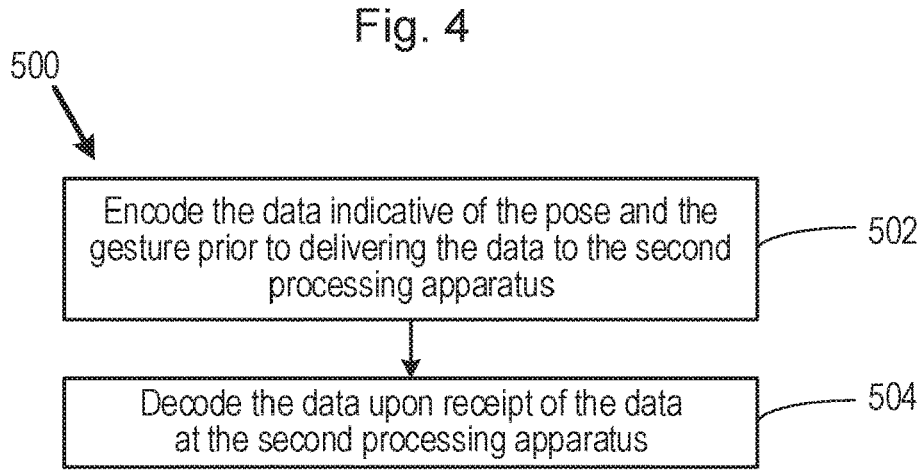
FIG. 5 is a flowchart of a further example of a method for operating a user interface.

FIG. 5 is a flowchart of a further example of a method 500 for operating a user interface, such as the user interface 106. The method 500 may include blocks of other methods disclosed herein. The method 500 may comprise, at block 502, encoding, using the first processing apparatus 114, the data indicative of the pose and the gesture prior to delivering the data to the second processing apparatus 116. Encoding the data at the first processing apparatus 114 prior to its delivery to the second processing apparatus 116 enables the data to be transmitted wirelessly, so that the data can be transmitted to a remote location. In some examples, data may be encrypted prior to delivery. In this way, if the data were to be intercepted during its delivery or transmission, then it would be more difficult to determine the intentions of the operator from the data. At block 504, the method 500 may comprise decoding, using the second processing apparatus 116, the data upon receipt of the data at the second processing apparatus. Thus, once the encoded data has been received by the second processing apparatus 116, it may be decoded and used to generate the representation 120 and to interpret any gestures performed by the control element 108. If the data has been encrypted, then the second processing 116 may be configured to decrypt the data upon receipt. In some examples, the data may be encoded in a vector format. In this way, the latency of the data communication may be reduced or minimised. In some examples, rather than transmitting a complete set of data representing the pose of the control element 108, changes in the pose may be transmitted (e.g. as changes to a set of data points) so that corresponding changes to the representation 120 may be made.

Figure 6:
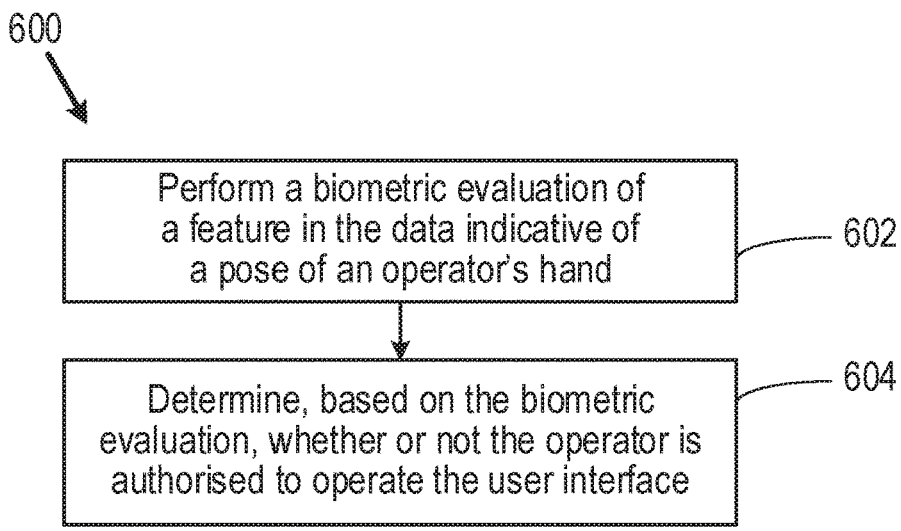
FIG. 6 is a flowchart of a further example of a method for operating a user interface.

In addition to capturing data indicative of the pose of the control element 108 and any gestures performed by the control element, the sensor 110 may also capture data relating to other features of the control element. When the operator's hand or another part of the operator's body is used as the control element, the sensor 110 may capture biometric data associated with the operator. For example, the sensor 110 may capture image data showing a fingerprint from a finger (or multiple fingerprints) of the operator's hand 108. In some examples, biometric data relating to the palm of the operator's hand 108 may be captured. In other examples, image features within data captured by the sensor 110 may be stored and associated with the operator. The data captured by the sensor may be used to recognise the operator during a subsequent use of the sensor. In some examples, a comparison of data captured by the sensor 110 for a particular operator may be made with stored data (e.g. a database in a memory associated with the first processing apparatus 114), and the operator may be authenticated if it is determined that the captured data matches stored data. In this way, the identity of an operator may be evaluated (e.g. periodically) to determine whether or not they are authorised to operate the user interface 106. FIG. 6 is a flowchart of a further example of a method 604 operating user interface, such as user interface 106. The method 600 may include blocks of other methods disclosed herein. The method 600 may comprise, at block 602, performing a biometric evaluation of a feature in the data indicative of a pose of the control element 108. At block 604, the method 600 may comprise determining, based on the biometric evaluation, whether or not the operator is authorised to operate the user interface 106. In some examples, if it is determined that the operator is not authorised to operate the user interface 106, action may be taken. For example, an authorised operator may be prevented from operating the user interface 106.

So far, the representation 120 generated and displayed for viewing on the user interface 106 has been described as an image representing the control element 108. In some examples, they representation 120 has been described as being and at least partially transparent shaded image of the control element 108. In other examples, however, the representation 120 may be generated by modifying the region outside of a boundary of the area defining the representation. For example, rather than positively generating an image (e.g. a silhouette or shadow) of the control element 108, a boundary of the representation (e.g. an outline representing the control element) may be defined based on the data captured by the sensor 110, and the area of the user interface 106 outside the boundary may be modified in some way. In some examples, the area outside the boundary of the representation 120 may be lightened relative to the representation 120; in some examples, the area outside of the boundary may be darkened relative to the representation; and in some examples, a colour of the user interface in the area outside the boundary may be adjusted relative to the representation. In this way, a viewer may still be able to see where on the user interface 106 the control element 108 is operating even though a positive representation of the control element is not generated. Thus, generating the representation 120 of the control element 108 may, in some examples, comprise determining, based on the data indicative of the pose, a boundary of the control element. Generating the representation 120 may further comprise modifying an appearance of the user interface 106 outside the boundary of the control element.

Some gestures which can be performed by the control element 108 may enable the operator to navigate around or over the user interface 106 without moving their hand a distance corresponding to the size of the display 104 on which the user interface is presented. As noted above, an operator may hold their hand 108 generally in a reference plane relative to the sensor 110. For example, in order to operate the user interface 106, the operator may hold their hand 108 substantially in a horizontal plane, or in a plane substantially parallel to a lens or capture surface (e.g. a charge-coupled device) of the sensor 110. The control element 108 may remain relatively stationary with respect to the sensor 110 such that the pose and any gestures performed by the control element may be captured by the sensor. In some examples, the operator may navigate around the user interface 106 by causing the representation 120 of their hand to move across the user interface. Movement of the representation 120 may be achieved, in some examples, by the user tilting their hand 108 relative to the plane (e.g. the horizontal plane or the plane parallel to the sensor 110) or may tilt their hand relative to the sensor. As a result, the representation 120 may be caused to move in a direction corresponding to the direction of tilt of the control element 108. The angle of tilt of the control element 108 (e.g. the amount of tilt) may correspond to the speed at which the representation 120 is moved over the user interface 106.

Figure 7:
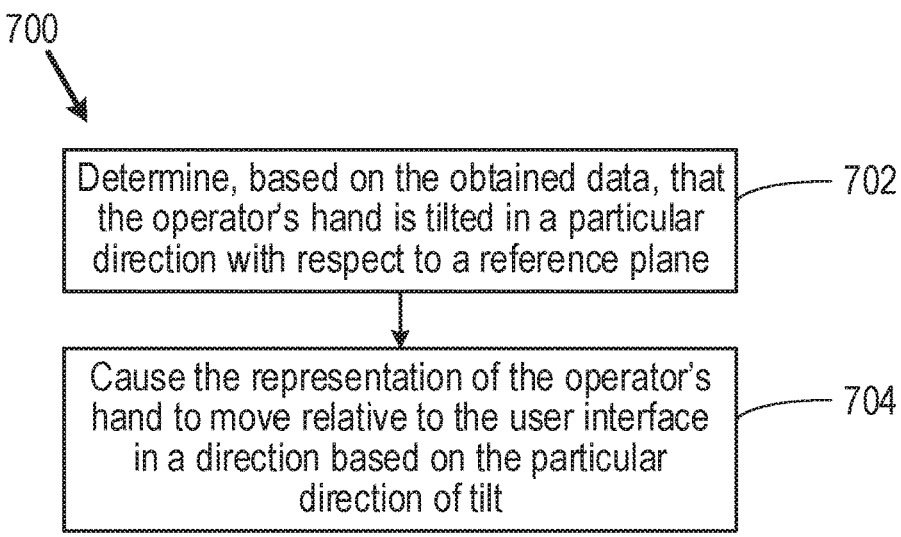
FIG. 7 is a flowchart of a further example of a method for operating a user interface.

FIG. 7 is a flowchart of a further example of a method 700 for operating a user interface, such as user interface 106. The method 700 may include blocks of other methods disclosed herein. The method 700 may comprise, at block 702, determining, based on the obtained data, that the control element 108 is tilted in a particular direction with respect to a reference plane. At block 704, the method 700 may comprise causing the representation 120 of the control element to move relative to the user interface 106 in a direction based on the particular direction of tilt. In some examples, the method 700 may comprise causing the representation 120 of the control element to move relative to the user interface 106 at a speed based on the degree, angle or amount of tilt. This functionality allows an operator to move in an easy and intuitive manner around the user interface 106, and may give the operator and viewers of the user interface the impression that the control element 108 is "flying" over the user interface.

The methods and apparatus disclosed herein may be implemented in any computing device or processing apparatus capable of receiving data indicative of a pose of and a gesture performed by an control element, interpreting the gesture performed, and generating a representation of the control element and performing an operation corresponding to the gesture in respect of the user interface. In this way, the methods and apparatus may be implemented in respect of any user interface which can receive user inputs. Any processing of the input data (e.g. the data captured by the sensor 110) is performed by the first and/or second processing apparatus 114, 116, so the nature of the user interface itself is generally irrelevant. In other words, the user interface itself does not need to recognise or interpret the data relating to the pose and gesture is of the operator 108, and the user interface itself does not need to render the representation 120 of the control element. The data processing, and the representation generation/rendering may be achieved at a different level or layer within the computing device running the user interface, such as at a firmware or operating system level.

In some examples, the methods disclosed herein may be implemented in respect of multiple user interfaces 106 concurrently. Thus, in some examples, and operator may move between user interfaces 106 being run on multiple different computing devices. In one example, an operator may move their hand 108 (e.g. in the manner described above) so as to cause the representation 120 of their hand to move from one user interface 106 to another. For example, when a representation 120 of a control element reaches an edge of a first user interface, the representation may move on to a second user interface. The first and second user interfaces may appear to be adjacent to one another, such that an operator is able to seamlessly move between them. In some examples, a first user interface may be displayed or presented on a first display, such as the display 104, and a second user interface may be displayed or presented on a second display, such as a screen or wall located adjacent to/behind the first display. As the operator causes of the representation 120 of their hand to move beyond the edge of the first user interface (e.g. using the tilting technique discussed above) the representation may begin to appear on the second user interface on the second display. In some examples, the user interface displayed on the first and second displays may be the same user interface. For example, the user interface of the first display may be repeated on the second display. In other examples, a portion of the user interface may be displayed on the first display while the remainder (or another portion) of the user interface may be displayed on the second display. In other examples, different user interfaces may be displayed on the first and second displays. Representations of some or all of the user interfaces may be presented for displayed to the operator, to enable the operator to see the user interface(s) during operation thereof. The functionality by which an operator may move between multiple displays and/or user interfaces is described with reference to FIG. 8.

Figure 8:
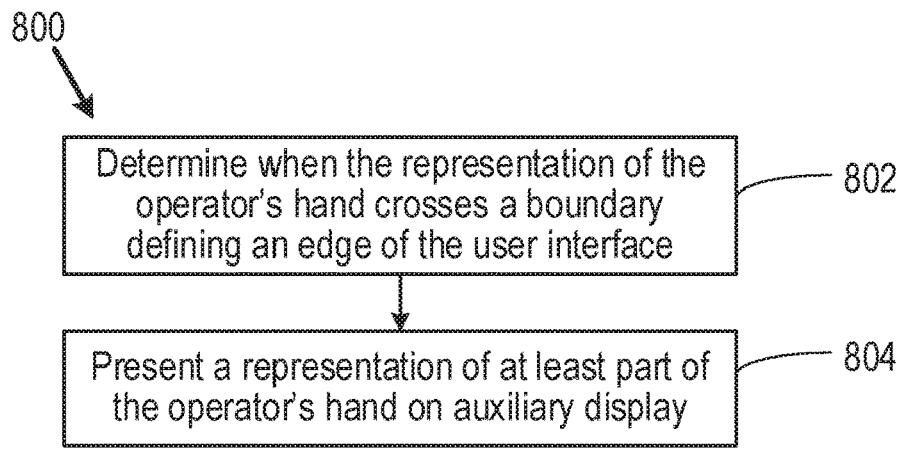
FIG. 8 is a flowchart of a further example of a method for operating a user interface.

FIG. 8 is a flowchart of a further example of a method 800 for operating a user interface, such as user interface 106. The method 800 may include blocks of other methods disclosed herein. The method 800 may comprise, at block 802, determining when the representation 120 of the control element crosses a boundary defining an edge of the user interface 106. At block 804, the method 800 may comprise presenting a representation of at least part of the control element on auxiliary display. The part of the representation of the control element presented on the auxiliary display comprises a portion of the representation of the control element which has crossed the boundary. In this way, multiple user interfaces may appear to be seamlessly joined to one another or arranged adjacent to one another.

Figure 9:
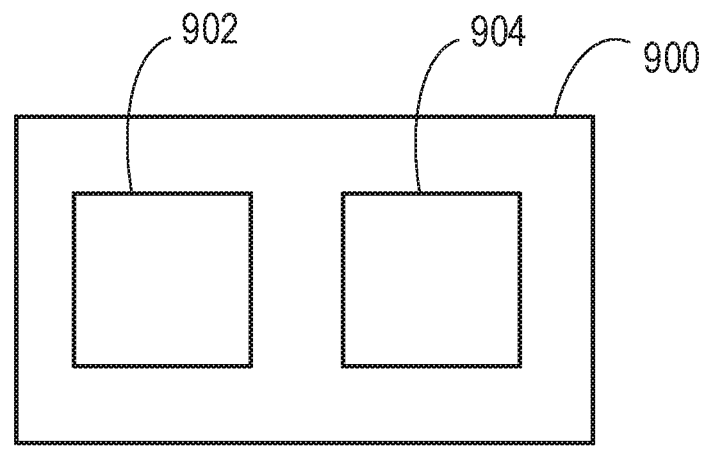
FIG. 9 is a simplified schematic of an example of apparatus for operating a user interface.

According to a further aspect, an apparatus for operating a user interface is disclosed. FIG. 9 is a simplified schematic of an example of apparatus 900. The apparatus 900 may be used to operate a user interface, such as user interface 106. The apparatus 900 comprises a first display unit 902 to display a user interface, and processing circuitry 904. The first display unit 902 may comprise the display 104 discussed above. In some examples, the processing circuitry 904 may comprise the second processing apparatus 116 discussed above. Thus, the first display unit 902 and the processing circuitry 904 may be associated with one another (e.g. connected to, and/or in communication with one another).

The processing circuitry 904 may receive data representing a pose of a control element 108 and a gesture performed by the control element, the data having been captured by a data capture device remote from the apparatus 900. The data capture device may, in some examples, comprise, or be similar to, the sensor 110. In some examples, the data capture device may include a touch sensitive device, such as the touching surface 112. The processing circuitry 904 may generate, based on the data representing the pose, a portrayal of the control element 108 to be displayed on the first display unit 902. The portrayal of the users hand may comprise a representation, such as the representation 120 discussed above. The processing circuitry 904 may display the portrayal of the control element on the first display unit 902. The processing circuitry 904 may establish, from the received data, an operation associated with the gesture performed by the control element 108. The processing circuitry 904 may execute the operation in respect of the user interface on the apparatus 900.

In some examples, the processing circuitry 904 may determine when the portrayal of the control element crosses a boundary defining an edge of the user interface. The processing circuitry 904 may display a portrayal of at least part of the control element on a second display unit. For example, the second display unit may appear to be adjacent to the first display unit such that the portrayal of the control element may move seamlessly from one display unit to another other. In some examples, the part of the control element displayed on the second display unit comprises a portion of the portrayal of the control element which has crossed the boundary. Therefore, in some examples, part of the control element may be portrayed in respect of the user interface displayed on the first display unit while another part of the control element may be portrayed in respect of the user interface displayed on the second display unit.

Figure 10:
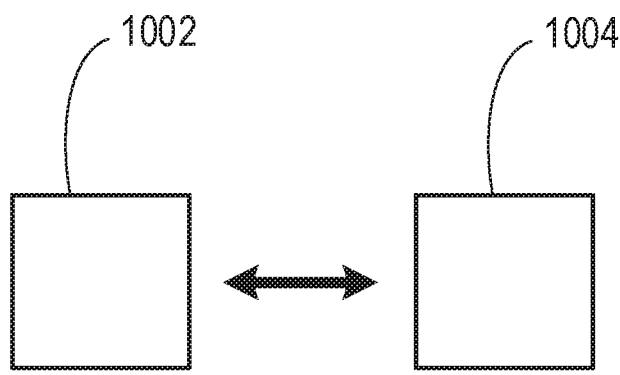
FIG. 10 is a simplified schematic of an example of a machine-readable medium and a processor.

According to a further aspect, a machine-readable medium is disclosed. FIG. 10 is a simplified schematic of a machine-readable medium 1002 and a processor 1004. The machine-readable medium 1002 comprises instructions which, when executed by a processor 1004, may cause the processor to perform processes of the blocks of the methods disclosed herein. For example, the machine-readable medium 1002 may comprise instructions which, when executed by the processor 1004, cause the processor to receive data indicative of a pose of a control element and a gesture performed by the control element, the data having been captured by a sensor remote from the processor 1004; generate, based on the data indicative of the pose, a representation of the control element to be presented on a user interface; present the representation of the control element on the user interface; determine an operation corresponding to the performed gesture; and perform the operation in respect of the user interface. The processor 1004 may comprise, or be similar to the second processing apparatus 116 discussed above. The sensor may comprise the sensor 110 discussed above. The user interface may comprise the user interface 106 discussed above.

According to the methods, the apparatus and machine-readable medium disclosed herein, an operator may interact with and/or control a user interface located remotely from them. The operator may move, and perform gestures with, his or her hand such that a sensor is able to capture data describing a pose of the control element and data describing a gesture performed by the control element. The data may then be transmitted to a computing device on which a user interface is running, so that the operator, despite not being in the presence of the computing device, and despite potentially not even being able to see the user interface, is able to interact with the user interface, input data into the user interface, and otherwise manipulate data, documents, images and so on in respect of the user interface.

In some examples, the operator may be a non-human operator. For example, a computer-operated "hand", such as a robot hand or a prosthetic hand, may be used to interact with the user interface 106 using the methods disclosed herein.

Since the user interface 106 can be operated by an operator without the control element touching any physical surface, interaction with the user interface is enabled even in situations where the control element is dirty, or where the control element (e.g. the operator's hand) must remain sterile, such as in a medical environment.

In some examples, multiple operators may interact with a single user interface. For example, data may be captured by multiple sensors, such as sensor 110, and multiple representations may be generated and displayed over a user interface or over multiple user interfaces. Each operator may interact with the user interface concurrently. In this way, multiple operators may be located remote from one another, yet their interactions with the user interface may all be viewed by a viewer of the user interface. Furthermore, since representations of the control elements of the multiple users are generated, a viewer of the user interface may be able to see actions or gestures performed by the multiple operators' control elements as if they were in the same room. Such functionality may be used, for example, to express approval or agreement in a "show of hands".

Examples disclosed herein may be implemented into a virtual reality environment. In such examples, a three-dimensional representation of the control element may be generated and displayed to a viewer.

In the examples described herein, some functions (e.g. blocks) are described as being performed using the first processing apparatus 114 or the second processing apparatus 116. According to some examples, the functions may be performed by any other processing apparatus. In other words, those processes described as being performed by the first processing apparatus 114 may be performed by the second processing apparatus 116, and those processes described as being performed by the second processing apparatus 116 may be performed by the first processing apparatus 114. In some examples, various functions (e.g. blocks of the methods described herein) may be shared between the first and second processing apparatus 114, 116 and/or other processing apparatus.

The examples discussed above have been described in the context of a single operator using a single hand 108 (or other control element) to interact with the user interface 106. However, an operator may interact with the user interface using two hands or control elements. In such examples, the sensor 110 may capture data relating to the poses and gesture of both hands or control elements, or a separate sensor may be used to capture data relating to each of the control elements. In other examples, multiple operators may use one or both of their hands or control elements to interact with a user interface. Again, a single sensor 110 or multiple sensors may be used to capture data from the control elements. Operating a user interface using multiple hands or control elements may find particular application in the field of virtual reality, where an operator might interact with a three-dimensional user interface presented in front of them. Where multiple hands or control elements are used, gestures or poses formed using more than one hand may have a particular purpose, and may be used to perform a particular operation which may not be possible using a single hand.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. [Computer implemented] It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   obtaining, using an optical-based sensor associated with a first processing apparatus, data indicative of a pose of a control element and a gesture performed by the control element, wherein the data indicative of the pose corresponds to an orientation and position of the control element relative to the optical-based sensor and a reference surface;
   determining a vector corresponding to a change between the data indicative of the pose and gesture and a previous data indicative of a previous pose and gesture;
   delivering the vector from the first processing apparatus to a second processing apparatus, the second processing apparatus associated with a computing device for displaying a user interface, wherein the second processing apparatus is remote from the first processing apparatus;
   generating, based on the vector, a representation of the control element to be presented on the user interface;
   presenting the representation of the control element on the user interface; determining, using the second processing apparatus, an operation corresponding to the performed gesture; and
   performing the operation in respect of the user interface on the computing device.

2. A method according to claim 1, further comprising:
   presenting a representation of the user interface for display to the operator; and
   presenting the representation of the control element on the representation of the user interface.

3. A method according to claim 2, further comprising:
   delivering the data indicative of the pose and the gesture from the first processing apparatus to a display associated with the first processing apparatus; wherein presenting the representation of the user interface comprises presenting the representation of the user interface on the display.

4. A method according to claim 1, wherein the data indicative of the pose includes at least an outline of the control element.

5. A method according to claim 1, wherein generating the representation of the control element comprises generating a representation through which the user interface remains visible.

6. A method according to claim 1, further comprising:
obtaining data indicative of a touch event performed by the control element on a touch input surface associated with the first processing apparatus;
determining, using the second processing apparatus, a touch operation corresponding to the touch event; and
performing a touch operation in respect of the user interface on the computing device.

7. A method according to claim 1, further comprising:
encoding, using the first processing apparatus, the data indicative of the pose and the gesture prior to delivering the data to the second processing apparatus; and
decoding, using the second processing apparatus, the data upon receipt of the data at the second processing apparatus.

8. A method according to claim 1, further comprising:
performing a biometric evaluation of a feature in the data indicative of a pose of the control element; and
determining, based on the biometric evaluation, whether or not the operator is authorized to operate the user interface.

9. A method according to claim 1, wherein generating the representation of the control element comprises:
determining, based on the data indicative of the pose, a boundary of the control element; and
modifying an appearance of the user interface outside the boundary of the control element.

10. A method according to claim 1, further comprising:
determining, based on the obtained data, that the control element is tilted in a particular direction with respect to a reference plane; and
causing the representation of the control element to move relative to the user interface in a direction based on the particular direction of tilt.

11. A method according to claim 1, further comprising:
determining when the representation of the control element crosses a boundary defining an edge of the user interface; and
presenting a representation of at least part of the control element on an auxiliary display;
wherein the part of the representation of the control element presented on the auxiliary display comprises a portion of the representation of the control element which has crossed the boundary.

12. An apparatus, comprising: a first display unit to display a user interface; and processing circuitry to: receive data representing a pose of a control element and a gesture performed by the control element, the data having been captured by an optical-based sensor remote from the apparatus, wherein the data representing the pose corresponds to an orientation and position of the control element relative to the optical-based sensor and a reference surface; determine a vector corresponding to a change between the data representing a pose and a previous data representing a previous second pose; generate, based on the vector, a portrayal of the control element to be displayed on the first display unit; display the portrayal of the control element on the first display unit; establish, from the received data, an operation associated with the gesture performed by the control element; and execute the operation in respect of the user interface on the apparatus.

13. An apparatus according to claim 12, wherein the processing circuitry is further to:
determine when the portrayal of the control element crosses a boundary defining an edge of the user interface; and
display a portrayal of at least part of the control element on a second display unit.

14. An apparatus according to claim 13, wherein the part of the control element displayed on the second display unit comprises a portion of the portrayal of the control element which has crossed the boundary.

\* \* \* \* \*